K. A. EDSTROM.
MECHANISM FOR DELINEATING CROSS SECTION CONTOURS.
APPLICATION FILED MAY 9, 1911.
1,095,317.
Patented May 5, 1914.
2 SHEETS—SHEET 1.
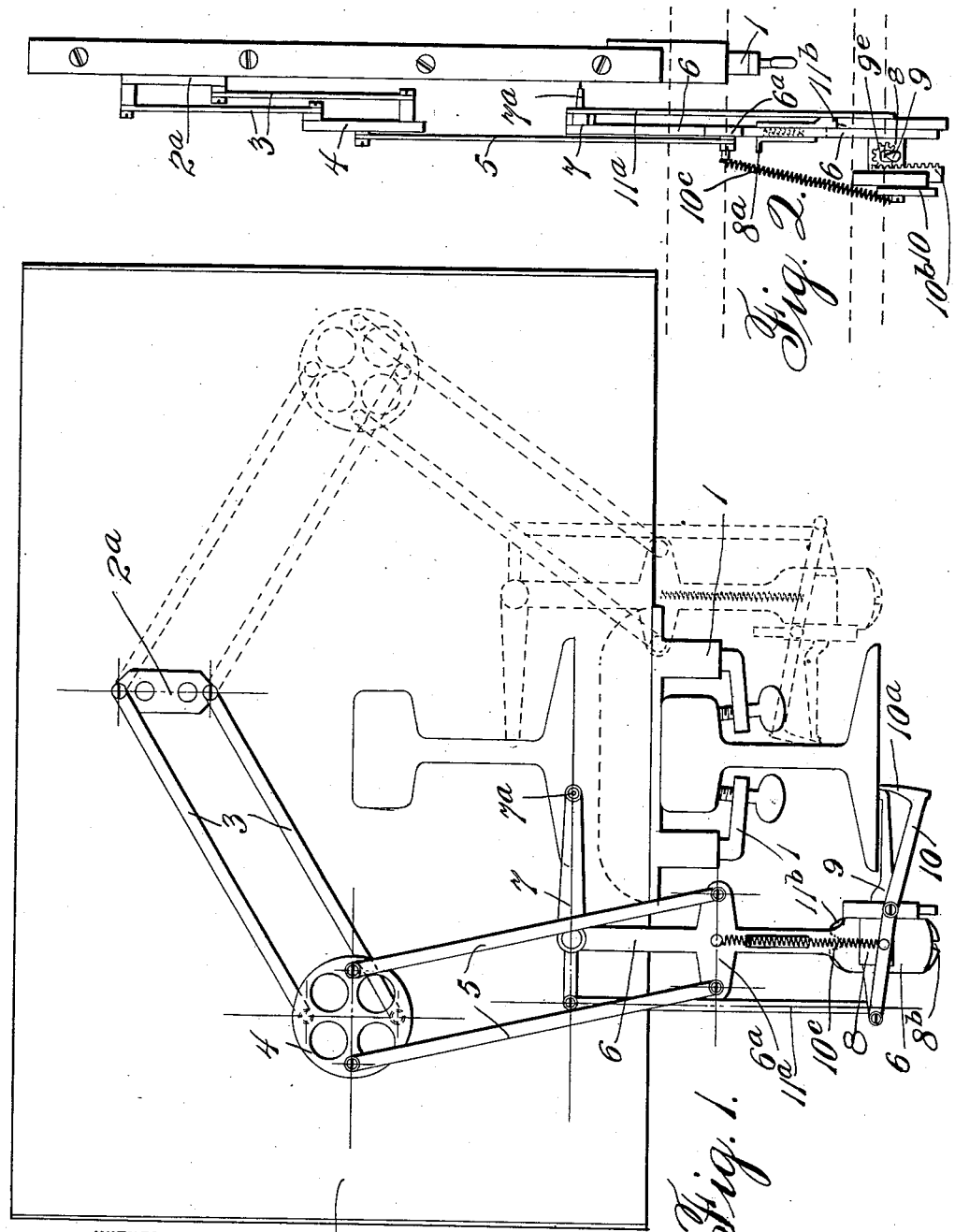
WITNESSES:
Albert L. Frey
Golden Taylor
INVENTOR
Karl A. Edstrom
BY
ATTORNEY K. A. EDSTROM.
MECHANISM FOR DELINEATING CROSS SECTION CONTOURS.
APPLICATION FILED MAY 9, 1911.
1,095,317.
Patented May 5, 1914.
2 SHEETS—SHEET 2.
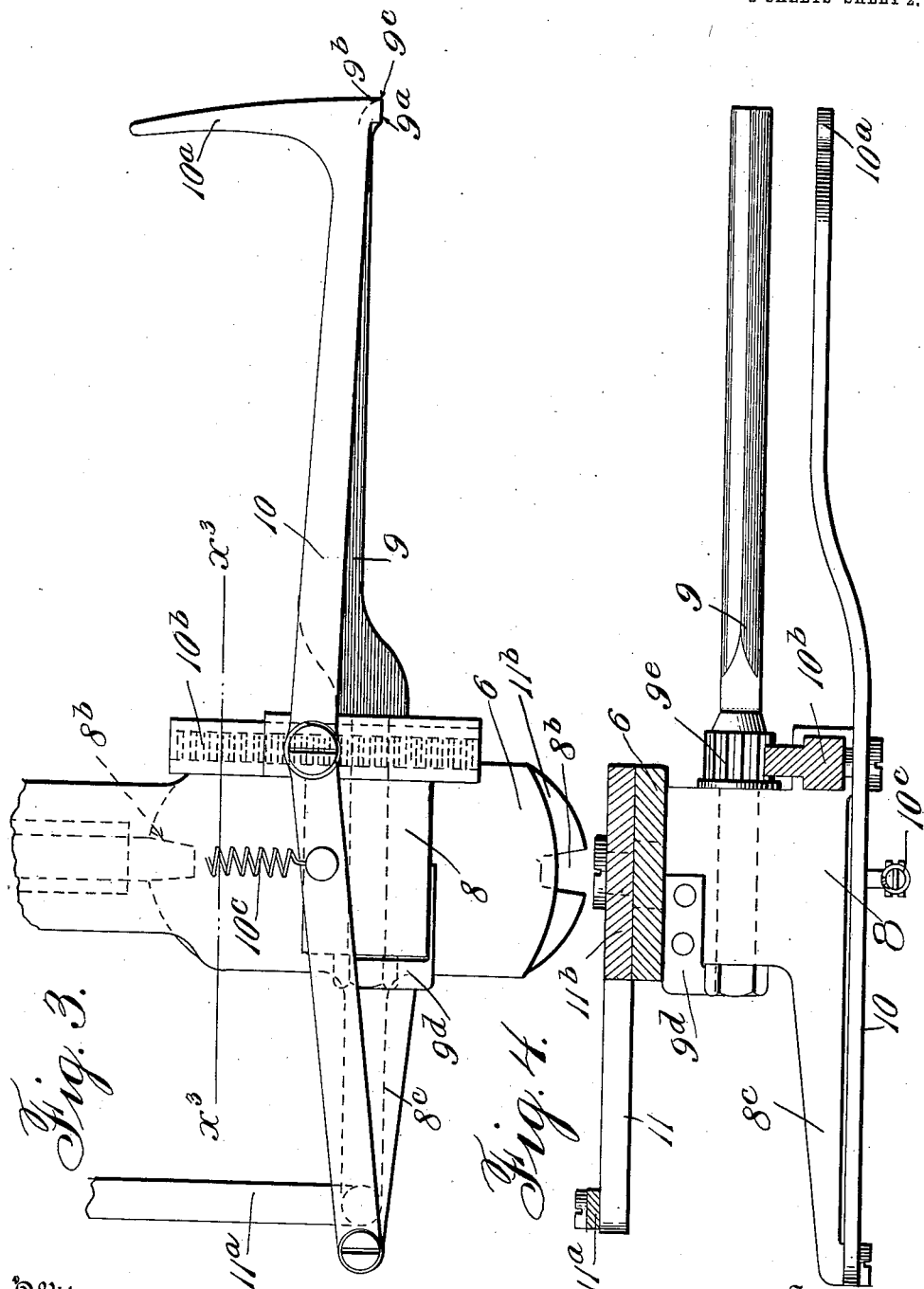

UNITED STATES PATENT OFFICE.

KARL A. EDSTROM, OF DENVER, COLORADO, ASSIGNOR OF TWO-FIFTHS TO OTTO HALKOWIEZ, OF DENVER, COLORADO.

MECHANISM FOR DELINEATING CROSS-SECTION CONTOURS.

1,095,317.  Specification of Letters Patent.  Patented May 5, 1914.

Application filed May 9, 1911. Serial No. 626,108.

*To all whom it may concern:*

Be it known that I, KARL A. EDSTROM, a citizen of the United States of America, and a resident of the city and county of Denver and State of Colorado, have invented certain new and useful Improvements in Mechanism for Delineating Cross-Section Contours, of which the following is a specification.

My invention relates to a device for tracing upon a suitable surface such as paper, etc., the cross section of any object which it may be desired to measure or duplicate.

For this purpose it comprises a tracing point and trailer point, the latter of which is adapted to run over the surface to be delineated, having a fixed relation to each other, but capable of conjointly moving in any direction in a plane, each being also capable of motion around its own pivotal point, to permit the reversal of the facing of the parts to operate upon opposite surfaces of the object being measured.

It also comprises a trailer capable of angular movement around an axis passing through the contact face of the trailer and means whereby the trailer will be automatically turned on this axis to permit the contact face of the trailer to be held in contact with the surfaces of the object which are parallel therewith.

It further consists in the construction, arrangement and combination of the several parts of which it is composed as will be hereinafter more fully described and claimed.

Referring to the accompanying drawings in which corresponding parts are designated by corresponding marks of reference: Figure 1 is a front elevation of a structure embodying my invention and showing in dotted lines a second position thereof. Fig. 2 is an end elevation thereof. Fig. 3 is an enlarged view of the trailer arm and trailer turner in another position. Fig. 4 s a horizontal section on line $x^3$—$x^3$ of Fig. 3.

The clamp 1 is of any approved construction adapted to receive and hold the object to be delineated and carries a plane table 2, on which, or on paper secured to which, the cross section of the object will be drawn. The plane table has secured to its upper part a bracket $2^a$, on which is pivoted the ends of the links 3 and 3, the opposite ends of which are pivoted to a disk 4, the links forming a parallel motion device. The disk 4 has also pivoted thereto, but on the opposite side to that on which the links 3 are pivoted, and at an angle of ninety degrees therefrom, the ends of a second pair of links 5, the opposite ends of which are pivoted to the cross-head $6^a$ of a frame 6, the links 5 also forming a parallel motion device.

By the construction so far disclosed it will be seen that the frame 6 is capable of motion in all directions in a plane parallel with the plane of the table 2, and in a plane which will in practice generally be at right angles to the longitudinal axis of the object being delineated.

To the upper part of the frame 6 a tracing arm 7 is pivoted intermediate of its length on an axis at right angles to the drafting plane, one extremity of the arm carrying a pencil or stylus $7^a$ of any approved construction. The lower end of the frame 6 has pivoted thereto also on an axis at right angles to the drafting plane a head 8, which may be locked in positions one hundred and eighty degrees apart by a spring bolt $8^a$ carried by the frame and adapted to engage diametrically opposite recesses $8^b$ in the plate 11 hereinafter referred to. An approximately horizontal trailer arm 9 is carried by the head in a bearing formed in the latter whose axis is parallel with the drafting plane, the arm 9 terminating in horizontal and vertical contact faces $9^a$ and $9^b$ which together form a contact point $9^c$ located in the prolongation of such axis. The trailer arm is capable of angular motion around such axis, but is normally locked in one of two diametrically opposite positions by means of a spring lock $9^d$. The head has on that side thereof opposite the trailer arm a lateral extension $8^c$, to which is pivoted one end of an arm 10 which extends therefrom along the side of the trailer arm and terminates adjacent to the end thereof in a finger $10^a$ which projects above or below the contact face $9^a$ of the latter. The arm 10 carries on its forward face a rack $10^b$ which meshes with a pinion $9^e$ formed on or secured to the trailer arm, whereby an angular movement of the arm 10 about its pivotal point will result in a rotation of the trailer arm on its axis. The arm 10 thus constitutes means for turning the trailer, and is normally held lifted by a spring 10ᶜ. The trunnion 8ᵈ by which the head is carried in the frame projects through the latter to the rear thereof where it receives a plate 11ᵇ in which are the diametrically opposite recesses 8ᵇ before referred to and which has a lever arm 11, whose free end is connected to the corresponding end of the tracing arm 7, by the link 11ᵃ, the conection being such that when the trailer arm is given an angular movement on the frame, the tracer arm will receive a similar movement.

The construction being as above described, the method of operating the device is as follows, it being presumed that the object whose cross section is to be depicted is a railway rail A held in the clamp 1 as shown, and that the parts are in the position shown in full lines in Fig. 1, with the trailer contact face 9ᵃ and the end of the finger of the trailer turner bearing in the bottom surface of the base of the rail: As the frame 6 is moved horizontally toward the left the contact face of the trailer will run along the bottom and the stylus will receive a corresponding movement, drawing a straight line on the table 2. When in this movement the finger 10ᵃ moves from beneath the base, the trailer turner arm 10 is lifted rapidly by the spring 10ᶜ and the trailer arm rotated through one hundred and eighty degrees, whereby the contact face 9ᵃ thereon will be reversed in position, to bear in the top face of the web where the frame 6 is moved toward the right. Inasmuch as the contact point 9ᶜ is in the prolongation of the axis on which the trailer arm turns, its position in space is not affected by this reversal. The frame is now moved upwardly and to the right to cause the contact faces to follow the contour of the rail, the face 9ᵇ being the contact face for the vertical walls thereof. When in this movement the finger 10ᵃ comes in contact with the bottom of the head of the rail, (see Fig. 2) the trailer turner arm 10 will be again depressed on its pivot restoring the trailer arm to its previous condition with the face 9ᵃ raised so that the contact point may be properly positioned.

It will be noted that in the operation before described the movement of the tracer arm and head on their pivots are not used. The function of such pivotal mounting is to permit the reversal of the parts to permit them to be successively employed on opposite sides of the object. Thus when in the movements before stated one side of the rail has been delineated, the disk 4 and frame 6 may be swung by the links 3 and 5 to the opposite side of the board, and the head 8 and tracing arm each swung on their pivotal connection with the frame through an arc of one-hundred and eighty degrees whereby the parts will be properly positioned to follow on the opposite side of the object.

While in the above description the board is referred to as mounted above the object, it will be understood that it may be located to one side or below the same, and that in such event the relative location of the parts to each other will partake of a similar change.

Having thus described my invention what I claim and desire to secure by Letters Patent is:—

1. In a device of the character specified, a trailer arm and a trailer turning arm mounted for movement together in a plane and being also capable of independent movement, and mechanism whereby the trailer arm is rotated by the movement of the trailer turning arm.

2. In a device of the character specified, a trailer arm and a trailer turning arm mounted for movement together in a plane and being also capable of independent movement, the trailer arm having a contact point and the trailer turner having a contact finger adapted to be depressed by the object to be delineated, and connections between said arms for rotating the trailer arm during the depression of said finger.

3. In a device of the character specified, the combination with a frame movable in a plane, of a stylus and a trailer arm pivotally mounted on the frame, and connections between the trailer arm and the stylus whereby they may be reversed in position upon the frame and maintained in the same relation to each other.

4. In a device of the character specified, the combination with a frame movable in a plane, of a stylus arm and a trailer arm pivotally mounted on the frame, the trailer arm being also mounted for rotating motion, and having a contact point located in its axis of rotation, and connections between the trailer arm and stylus whereby they may be rotated in position upon the frame and maintained in the same relation to each other.

5. In a device of the character specified, the combination with a frame movable in a plane, of a stylus arm and head pivotally mounted on the frame, a connection between the arm and head whereby they may be reversed in position upon the frame and maintained in the same relation with each other, and a trailer arm journaled in the head and having a contact point located in its axis of rotation.

6. In a device of the character specified, the combination with a frame movable in a plane, of a stylus arm and head pivotally mounted on the frame, a connection between the arm and head whereby they may be reversed in position upon the frame and maintained in the same relation with each other, a trailer arm journaled in the head and having a contact point located in its axis of rotation and means for locking the head on the frame in a plurality of positions.

7. In a device of the character specified, the combination with a frame movable in a plane, of a stylus arm and head pivotally mounted on the frame, a connection between the arm and head whereby they may be reversed in position upon the frame and maintained in the same relation with each other, a trailer arm journaled in the head and having a contact point located in its axis of rotation, a trailer turner pivoted to the head and having a finger adjacent to the contact point of the trailer arm, and means actuated by the movement of the trailer turner to rotate the tracker.

In testimony whereof I hereunto sign my name in the presence of two witnesses.

KARL A. EDSTROM.

Witnesses:
 F. A. SEBOLDT,
 A. H. ARONSON.

Copies of this patent may be obtained for five cents each, by addressing the "Commissioner of Patents, Washington, D. C."